United States Patent [19]

Rentch

[11] Patent Number: 4,499,994
[45] Date of Patent: Feb. 19, 1985

[54] PHONOGRAPH RECORD AND ALBUM FRAME

[76] Inventor: Bruce W. Rentch, 7804 Byrds Nest Pass, Annandale, Va. 22003

[21] Appl. No.: 491,811

[22] Filed: May 5, 1983

[51] Int. Cl.³ .............................................. B65D 5/50
[52] U.S. Cl. ............................ 206/45.19; 206/45.34; 206/310; 206/0.8; 206/303; 206/223; 206/575
[58] Field of Search .............. 206/303, 309, 310, 312, 206/45.34, 45.19, 0.8, 575, 223; 40/152, 10 D

[56] References Cited

U.S. PATENT DOCUMENTS

| | | | |
|---|---|---|---|
| 1,121,239 | 12/1914 | Fuller | 206/310 |
| 1,137,126 | 4/1915 | Fuller | 206/310 |
| 1,585,846 | 5/1926 | Frisbie | 206/310 |
| 2,663,416 | 1/1948 | Hirsch | 206/62 |
| 3,107,783 | 10/1963 | Corey et al. | 206/62 |
| 3,949,872 | 4/1976 | Paudras | 206/310 |
| 3,951,264 | 4/1976 | Heidecker et al. | 206/303 |
| 4,076,119 | 2/1978 | Clarice | 206/303 |
| 4,084,690 | 4/1978 | Pulse | 206/303 |
| 4,089,414 | 5/1978 | Sandor et al. | 206/303 |
| 4,120,398 | 10/1978 | Braddon, Sr. | 206/303 |
| 4,124,118 | 11/1978 | Helm | 206/303 |
| 4,145,826 | 3/1979 | Shaw | 40/152 |
| 4,176,744 | 12/1979 | Borzak | 206/303 |
| 4,244,303 | 1/1981 | Kurasik | 40/152 |
| 4,258,488 | 3/1981 | Schienbein | 40/152 |
| 4,327,831 | 5/1982 | Inaba et al. | 206/310 |

Primary Examiner—Joseph Man-Fu Moy
Attorney, Agent, or Firm—Joseph G. Seeber

[57] ABSTRACT

A phonograph record and album frame having a base member, a frame member cooperating and releasably engageable with the base member to define an enclosed space for encompassing an article to be held in the frame, and a holding member selectively cooperating with the base member to hold an article in a desired position within the enclosed space. The base member preferably has a cylindrical recess formed in its upper surface for receiving a phonograph record. A bore extends through the base member to receive a shaft of a holding member than holds the record within the recess. When an album is positioned within the frame, the head of the holding member is positioned adjacent the lower surface of the base member.

15 Claims, 4 Drawing Figures

PHONOGRAPH RECORD AND ALBUM FRAME

BACKGROUND OF THE INVENTION

Field of the Invention

The present invention provides a frame for displaying a phonograph record, a phonograph album, a phonograph sleeve, or a like article. The term "album" hereinafter is used to identify an album, record sleeve, or like item.

DESCRIPTION OF THE PRIOR ART

Known in the prior art are holders for video discs and like items. Also, known are frames for holding and displaying "gold" and "platinum" records. Such frames or holders, however, are not readily adaptable to selectively display either a phonograph record or phonograph album.

Some examples of previously known holders are U.S. Pat. No. 2,663,416, U.S. Pat. No. 3,107,783, and U.S. Pat. No. 4,327,831.

SUMMARY OF THE INVENTION

The present invention provides a frame for selectively displaying a phonograph record, a phonograph album, or a like item. The materials used to construct the frame are selected so that the frame is useful for permanent display.

One embodiment of the present invention provides a phonograph record and album frame having a base member, a frame member cooperating with the base member to define an enclosed space for encompassing an article to be held in the frame, and a holding member for selectively retaining an article in a desired position within the enclosed space.

Considering one embodiment of the base member in more detail, it has an upper surface provided with a cylindrical recess having a diameter equal to or slightly larger than the diameter of a phonograph record to be held in the frame. When the frame is designed for use for a record of the type commonly referred to as a "45", a cylindrical projection having a diameter equal to or slightly less than the opening in the center of the record projects upwardly from the bottom of the recess. A through bore is provided in the base member coaxially with the axis of the recess. A holding member having an enlarged head is inserted into the through bore so that the head engages and retains a phonograph record in the recess. When an album cover is to be retained with the frame, the shaft of the holding member is inserted into the through bore from the opposite direction so that the enlarged head is positioned adjacent to a lower surface of the base member. Thus, should a user subsequently desire to display a phonograph, the holding member is readily available.

The frame member is shaped similar to a picture frame and has an exterior support frame holding a transparent plate member that allows viewing of the phonograph record or album positioned within the enclosed space. In one embodiment, a portion of the support frame is frictionally engageable with the peripheral edge of the base member to form the frame.

The invention, and its objects and advantages, will become more apparent in the detailed description of the preferred embodiments hereinafter presented.

BRIEF DESCRIPTION OF THE DRAWINGS

In the detailed description of the preferred embodiments hereinafter presented, reference is made to the accompanying drawings, in which.

DESCRIPTION OF THE PREFERRED EMBODIMENTS

The present description will be directed in particular to elements forming part of, or cooperating more directly with, the present invention. Elements not specifically shown or described herein are understood to be selectable from those known in the art.

Figure 1:
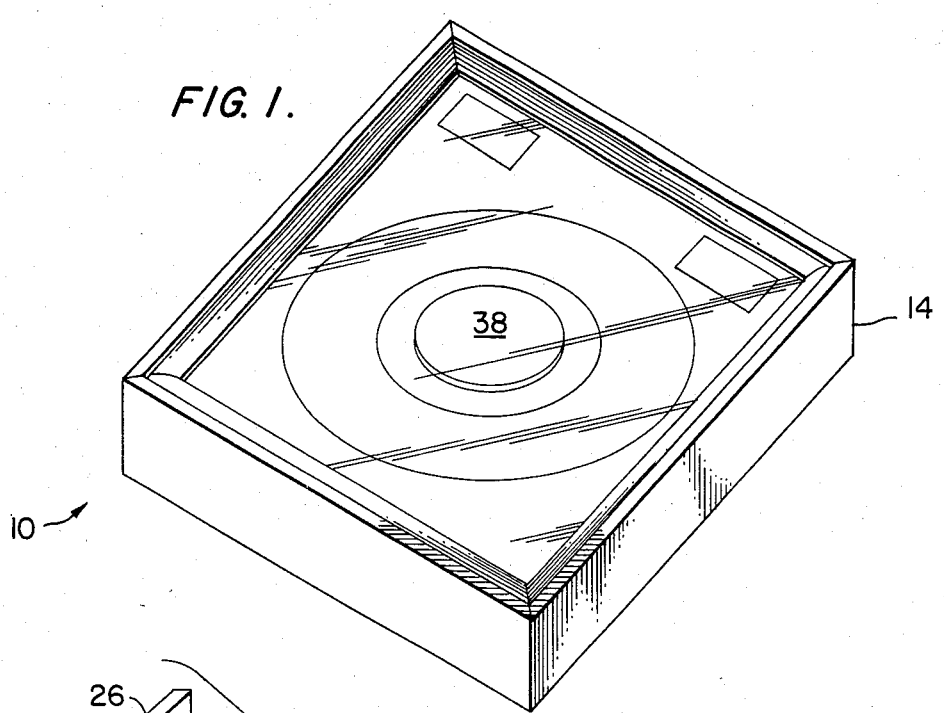
FIG. 1 is a perspective of one embodiment of a phonograph record and album frame according to the present invention used to display a phonograph record.

Referring now to the drawings, and to FIGS. 1 to 3 in particular, one embodiment of the present invention is illustrated and will be described in connection with a phonograph record and album frame, generally designated 10. The frame 10 includes a base member 12, a frame member 14, and a holding member 16.

Figure 2:
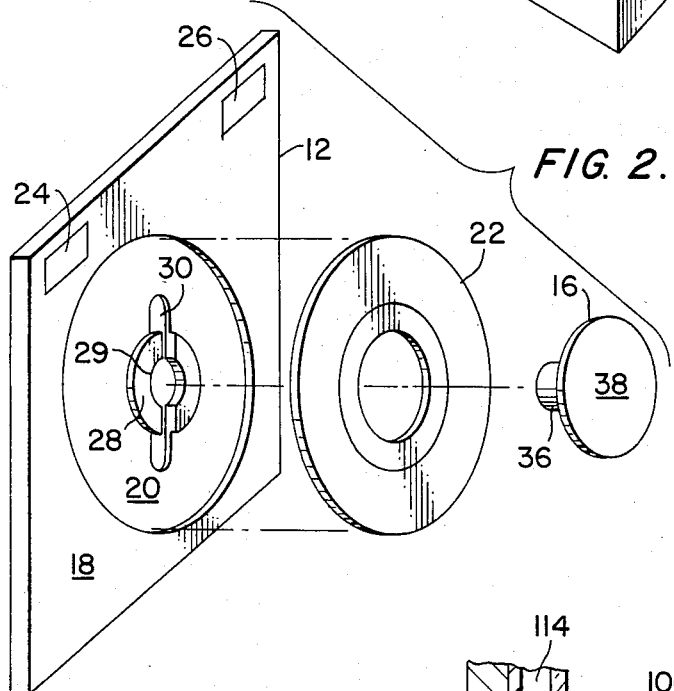
FIG. 2 is an exploded perspective of a portion of the embodiment of FIG. 1.

As best illustrated in FIG. 2, the base member 12 has an upper surface 18 with a cylindrical recess 20 formed therein. The diameter of the recess is equal to or slightly greater than the diameter of a record or other item 22 to be received in the recess. Provision is made on the upper surface for identifying indicia of the record received in the recess, such indicia being schematically represented by the blocks 24 and 26. A cylindrical projection 28 extends upwardly from the bottom surface of the recess 20. The diameter of the projection 28 is equal to or slightly smaller than the diameter of the circle encompassed within the record 22. A bore 29 extends through the thickness of the base member 12 and, preferably, is coaxial with the axis of the recess 20 and the axis of the projection 28. Preferably, one, or more preferably, two, elongated grooves or recesses 30 are formed in the lower surface of the recess 20 to facilitate insertion or removal of a record 22. As illustrated in FIGS. 2 and 3, such grooves 30 do not extend to the rear or lower surface 32 of the base member. Provision of the grooves makes it possible to install or remove a record by contacting only the inner boundary of the record. No contact is required with the outer boundary or recorded portion of the record.

Figure 3:
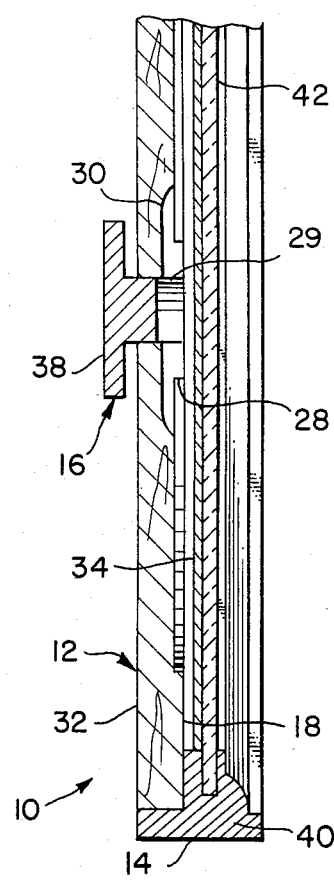
FIG. 3 is a partial sectional view of the embodiment of FIG. 1 used to display an album.

As best illustrated in FIG. 3, the projection 28 has a top surface that is coplanar with the upper surface 18 of the base member 12. Thus, the two surfaces cooperate with each other to provide support for a phonograph album 34 encompassed within the frame.

As illustrated in FIGS. 2 and 3, the holding member 16 has a shaft 36 that is frictionally engageable in the bore 29. As illustrated in FIGS. 1 and 2, and enlarged head 38 of the holding member 16 is engageable with a record to thereby retain the record within the recess 20. When the frame 10 is used to hold an album, as illustrated in FIG. 3, the enlarged head 38 is positionable adjacent the lower surface 32 of the base member 12. In this manner, the holding member is readily accessible should a user subsequently desire to display a record within the frame.

Referring now to FIG. 3, it can be seen that frame member 14 has an exterior support frame 40 that holds a transparent plate member or piece of glass 42. Glass is preferable to avoid the yellowing problem often encountered with plastic. In the illustrated embodiment, the support frame 40 has a recessed groove receiving the plate member 42 so that a pleasing esthetic appearance is presented. The support frame 40 also has a portion frictionally engageable with side edges of the base member 12 in such manner that an enclosed space is defined between the upper surface 18 of the base member 12 and a lower surface of the plate member 42. Such enclosed space is sized to receive either the record 22 or the album 34 and protects the received item from dust or other contamination. It also is possible to position the record 22 in the recess 20 and then to position the album between the record and the plate 42. In the latter case, the head of the holding member 16 would be positioned adjacent the rear surface of the frame.

Figure 4:
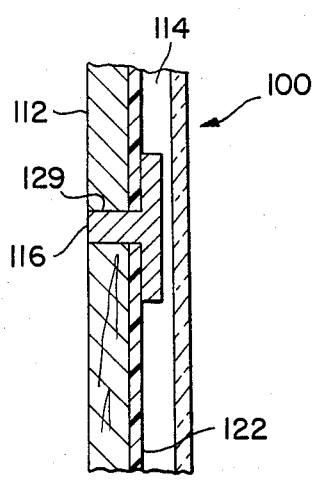
FIG. 4 is a schematic partial sectional view of a second embodiment of the present invention used to display a phonograph record.

Referring now to FIG. 4, another embodiment of the present invention, generally designated 100, is illustrated. The frame 100, like the frame 10, includes a base member 112, a frame member 114, and a holding member 116. A bore 129 extends through the thickness of the base member 112. The diameter of the bore is substantially equal to the diameter of the shaft of the holding member 116 and equal to the diameter of the spindle receiving opening formed in the record 122. The record 122 is of the size conventionally referred to as either a "33" or a "78". This embodiment is used in the same manner as the embodiment illustrated in FIGS. 1 to 3.

Previously, specific embodiments of the present invention have been described. It should be appreciated, however, that these embodiments have been described for the purposes of illustration only, without any intention of limiting the scope of the present invention. Rather, it is the intention that the present invention be limited only by the appended claims.

What is claimed is:

1. A phonograph record and album frame having a first mode of use wherein a phonograph record is displayed, and having a second mode of use wherein an album is displayed, said frame comprising:
    a base member having a first surface and a second surface;
    a cylindrical recess formed in the first surface of said base member, said cylindrical recess having an axis and having a predetermined diameter corresponding to the diameter of said phonograph record to be held in said cylindrical recess of said frame;
    a through bore formed in said base member, said through bore having an axis which is coaxial with the axis of said cylindrical recess;
    a holding member insertable into said through bore for retaining said phonograph record in said cylindrical recess;
    a frame member cooperating with and releasably engageable with said base member; and
    a transparent member engageably held by said frame member;
    wherein, in said first mode of use, said transparent member is disposed adjacent and in spaced relation to said first surface of said base member, whereby said phonograph record is displayed through said transparent member; and
    wherein, in said second mode of use, said transparent member is disposed adjacent and in spaced relation to said second surface of said base member so as to define an enclosed space therebetween for receiving and encompassing said album, whereby said album is held in said frame and displayed through said transparent member.

2. A frame according to claim 1, further comprising a cylindrical projection extending upwardly from the bottom of said cylindrical recess, said cylindrical projection encompassing and being coaxial with said through bore.

3. A frame according to claim 2, wherein said cylindrical projection has a surface coplanar with said first surface of said base member.

4. A frame according to claim 1, wherein said holding member has a shaft, received in said through bore, and an enlarged head, the enlarged head being engageable with a surface of the phonograph record, whereby to retain the phonograph record in said cylindrical recess.

5. A frame according to claim 2, wherein said holding member has a shaft, received in said through bore, and an enlarged head, the enlarged head being engageable with a surface of the phonograph record, whereby to retain the phonograph record in said cylindrical recess.

6. A frame according to claim 1, wherein said holding member has a shaft, received in said through bore, and an enlarged head, said enlarged head being positionable adjacent the second surface of said base member with said shaft in said through bore when the album is positioned in said frame.

7. A frame according to claim 2, wherein said holding member has a shaft, received in said through bore, and an enlarged head, said enlarged head being positionable adjacent the second surface of said base member with said shaft in said through bore when the album is positioned in said frame.

8. A frame according to claim 2, further comprising at least one groove recessed inwardly from a first surface of said cylindrical projection and extending outwardly from said through bore, said at least one groove being sized and shaped so as to permit insertion and removal of the phonograph record by contacting only an inner boundary of the phonograph record.

9. A combined phonograph record and album holding frame having a first mode of use for holding and displaying a phonograph record to be displayed, and having a second mode of use for holding and displaying an album to be displayed, said frame comprising a record receiving portion and an album receiving portion:
    said record receiving portion comprising a base member having a first surface and a second surface, said first surface having a cylindrical recess formed therein for holding said phonograph record to be displayed;
    said album receiving portion comprising a frame member cooperating with and releasably engageable with said record receiving portion, and a transparent member held by said frame member;
    wherein, in said first mode of use, said transparent member is disposed adjacent and in spaced relation to said first surface of said base member, whereby said phonograph record is displayed; and
    wherein, in said second mode of use, said transparent member is disposed adjacent and in spaced relation to said second surface of said base member so as to define an enclosed space therebetween for receiving an album to be displayed through said transparent member.

10. A frame according to claim 9, wherein said record receiving portion comprises a through bore formed in said base member.

11. A frame according to claim 10, further comprising holding member means insertable into said through bore of said base member for holding said phonograph record to be displayed in said cylindrical recess in said first mode of use, and for holding said album to be displayed in position adjacent said transparent member in said second mode of use.

12. A frame according to claim 11, wherein said holding member means comprises a shaft having an enlarged head formed at one end of said shaft, said shaft being received in said through bore and said enlarged head being engageable with a surface of the phonograph record to be displayed, whereby to retain the phonograph record to be displayed in said cylindrical recess in said first mode of use.

13. A frame according to claim 11, wherein said holding member means comprises a shaft having an enlarged head formed at one end of said shaft, said shaft being received in said through bore and said enlarged head being positioned adjacent to said base member, whereby to retain the album to be displayed in position adjacent said transparent member in said second mode of use.

14. A frame according to claim 10, further comprising a cylindrical projection extending upwardly from the bottom of said cylindrical recess so as to be engageable with a hole formed in the center of said phonograph record.

15. A frame according to claim 14, further comprising at least one groove formed in said cylindrical projection and recessed inwardly from a surface of said cylindrical projection, said at least one groove extending outwardly from said through bore, whereby to permit insertion and removal of said phonograph by contacting only an inner boundary of said phonograph record.

* * * * *